(12) United States Patent
Blumenau

(10) Patent No.: US 6,223,269 B1
(45) Date of Patent: Apr. 24, 2001

(54) STACKED MAPPED STORAGE SYSTEM

(75) Inventor: Steven M Blumenau, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 08/937,920

(22) Filed: Sep. 27, 1997

(51) Int. Cl.$^7$ ..................................................... G06F 12/00
(52) U.S. Cl. ............................. 711/202; 711/4; 711/111; 711/112; 711/113; 711/114; 711/161; 711/162; 711/203; 711/204; 707/204; 709/321
(58) Field of Search ................................. 711/4, 111–114, 711/209, 202–206, 161, 162; 707/200–204; 709/321–327

(56) References Cited

U.S. PATENT DOCUMENTS

| | | | |
|---|---|---|---|
| 5,379,412 | * 1/1995 | Eastridge et al. | 711/162 |
| 5,448,718 | * 9/1995 | Cohn et al. | 711/4 |
| 5,511,177 | * 4/1996 | Kagimasa et al. | 711/114 |
| 5,852,715 | * 12/1998 | Raz et al. | 395/200.31 |
| 5,875,479 | * 2/1999 | Blount et al. | 711/162 |

* cited by examiner

Primary Examiner—Than Nguyen
(74) Attorney, Agent, or Firm—John M. Gunther; Leanne J. Fitzgerald

(57) ABSTRACT

A stacked map storage system has a base mapping of logical data to physical locations in the storage system. Level maps are created either as positive or negative maps of a lower level map. A positive map enables an alternate view while keeping the next lowest level map the same. A negative map allows changes to a lower level map but stores references to the data in itself so the negative map becomes a backup. Negative maps freeze storage in themselves and are read-only. A positive map allows changes to itself and can be used by applications under test to make changes, while not allowing changes to the next lower level map to be made through the positive map. In a preferred embodiment, maps can be stacked to any number of levels, can be shared by applications and hosts, and can either be deleted or merged. Deletion removes the map as though it never existed. A merge overlays an upper view onto a lower view and thus changes the lower view to match the other's state. Both merger and deletion manipulate only the mapping information and do not change or move any stored data.

44 Claims, 13 Drawing Sheets

STACKED MAPPED STORAGE SYSTEM

BACKGROUND OF THE INVENTION

1. Field of the Invention

This invention relates generally to the field of mass storage systems such as multiple disk and tape systems and libraries and more particularly to methods and apparatus for organizing the data stored in such systems.

2. Background

As storage systems now permit huge amounts of data to be stored and retrieved by computers, more efficient techniques for managing the stored data are required. When files and data sets were only a few hundred thousand bytes or even a few megabytes in size, they could be backed up (read and copied in their entirety) in a few minutes. If a test update of the file caused errors in the new version, the old status quo could be restored to the storage system from a backup tape or disk in a few minutes. Similarly, updating the file often took only minutes. However, as disk capacity, and then multiple disk system capacity, such as that provided by Redundant Arrays of Independent Disks (RAID) systems and Hierarchical Storage Management (HSM) Systems, made it possible to store gigabytes of data, and then terabytes of data in larger and larger databases and data warehouses, disk management tasks such as backup and restore, testing, sharing data, cleanup, and so on can now take 8–12 hours or more to accomplish, even on powerful mainframe computer systems. Most users of such systems who need to install new versions of database software, for example, want to be able to test the new versions with "live data" but without corrupting the actual files on disk or tape. This used to be accomplished by making a copy of the "live" file and using the copy for testing. However, simply creating a test copy of a large database might take 8–12 hours or more, if every block in the database has to be read and then written to another disk or tape. If several application programs are being updated at the same time to use the new database software, each, in turn, might ideally require a separate copy of the database for final testing. It could literally take days to make the number of copies needed for thorough testing, and as many times the storage as there are programs needing copies. If the programs being tested are interdependent, that is, one updates the database for one purpose, then another program queries those changes and makes further updates for another purpose, the number of copies needed and the time required to make them can become burdensome and inefficient.

For production access to large files and databases, Redundant Arrays of Independent Disk (RAID) systems and similar fault tolerant techniques have helped to decrease the need to restore files from backups in the event of hardware disk failures. (If it takes 8–12 hours or more to completely backup the file, it will usually take the same amount of time to completely restore it.) Thus, when files become corrupted and need to be fully restored, it is increasingly likely to be caused by user error or programmer error rather than disk failure. This, in turn, further highlights the need for better methods for testing and evaluation of programmer updates and new user procedures.

The makers of database programs for large files have attempted to address the problems of backing up and restoring data by using incremental backups and transaction logs, that allow the user to make one "big" backup periodically and several smaller ones that only reflect what has changed. These may also be used in connection with transaction logs that let the database software recreate changes since some last specified incremental backup. Even so, backups such as these can still take hours when the files are big enough. They also may not reduce fragmentation problems or write penalties significantly, and in some cases, may add to them. They are also limited to specific database or application programs. Legacy applications (programs originally written years or even decades ago but still in production use on computers) using large files may not have access to such programs.

One technique, known as a "side file" has been used by Above Technology and Veritas to address part of the problem. In this approach, instead of updating the main file, the host computer has a special driver that creates a separate file, called the side file, and copies data to be written to it, instead of to the main file. When the side file fills up, the contents of the side file can be copied into the main file and then the side file is reused.

Another approach directed to minimizing write penalties is a technique known as log-structured files. In this approach, a log-structured file storage system typically writes all modifications to disk sequentially in a log-like structure. This speeds up file writing and crash recovery. In this approach, the log usually has index-like data so that files can be read back from the log efficiently. All writes typically go to the end of storage. While this improves the efficiency of writes, this approach will still tend to leave "holes" in the file. For that, garbage collection and compaction techniques are often used. In most such systems, the log is circular, so the storage system keeps reusing it. If the storage system saves the old blocks and a copy of all the pointers, it has a snapshot of the prior state before a write operation. Thus, the old view serves as a backup.

A variation of this is used by IBM in its RAMAC devices and by Storage Technology Corporation's Iceberg systems, to create a snapshot of the data. In this approach, a snapshot is simply the creation of a new view of the volume or data set being "snapped" by copying the pointers in the log file structure. None of the actual data is accessed, read, copied or moved. Any updates that are made to the snapshot will be effective for that view of the data; any other views remain unchanged. While the above techniques help alleviate some of the performance problems associated with backups and restores, they do not allow for interactions between views or multiple levels of views. Thus, in the testing example, using the RAMAC or Iceberg systems, one application program could update a snapshot of the device, but that cannot change any of the other views of the device that may have been created for that program or for other application programs. Nor do these approaches allow the user a number of options for dealing with views. These approaches have a single level of snapshots. Even if a snapshot is made from another snapshot, both exist at the same level. There is no relationship between the snapshots and they cannot inherit changes from each other.

It is an object of this invention to organize data stored in storage systems in a way that allows multiple levels of views of the data.

It is another object of the present invention to provide positive and negative views of the data.

Still another object of the present invention is providing a mechanism for merging varying views of the data.

Yet another object of the invention is to provide multiple levels of views of the data in which the state of one level may be dependent on other levels.

SUMMARY OF THE INVENTION

These and other objects are achieved by a stacked map storage system that starts with a base mapping of logical data to physical locations in the storage system. Level maps are created either as positive or negative maps of a lower level map or other positive or negative maps. A positive map enables an alternate view while keeping the next lowest level map the same. A negative map allows changes to a lower level map but stores references to the original data in the upper, negative map, so the upper, negative map becomes a backup. Negative maps freeze storage in themselves and are read-only. A positive map allows changes to itself and can be used by applications under test to make changes, while not allowing changes to be made through it to the next lower level map. In a preferred embodiment, maps can be stacked to any number of levels, can be shared by applications and hosts and can either be deleted or merged. Maps can also be inserted between other maps. A map can change from positive to negative or negative to positive. A positive map can be "rolled back" with changes being undone by a lower map. A negative map can be "rolled forward" with changes from a lower map. Deletion removes the map as though it never existed. A merge overlays an upper view onto a lower view and thus changes the lower view to match the other's state. Both merger and deletion manipulate only the mapping information and do not change or move any stored data.

It is an aspect of the present invention that it allows a number of combinations of maps to be created for testing purposes.

It is another aspect of the present invention that it allows hosts to share data without physically moving the files.

Still another aspect of the present invention is that it allows a user to have several options about committing to changes in a map.

Yet another aspect of the present invention is that it improves performance of read operations as well as writes.

Still another aspect of the present invention is that combinations of faster reads and overwrite commands enable the system to meet government requirements for secure data.

Another aspect of the present invention is that it can be extended so that a single map includes other types of media, such as tapes or optical disks, thereby improving the performance of Hierarchical Storage Management systems such as those described in applicant's co-pending application entitled Hierarchical Performance System, application Ser. No. 08/757,124, filed on Dec. 03, 1996, now U.S. Pat. No. 6,032,224 which is hereby incorporated by reference.

DETAILED DESCRIPTION OF THE INVENTION

Figure 1:
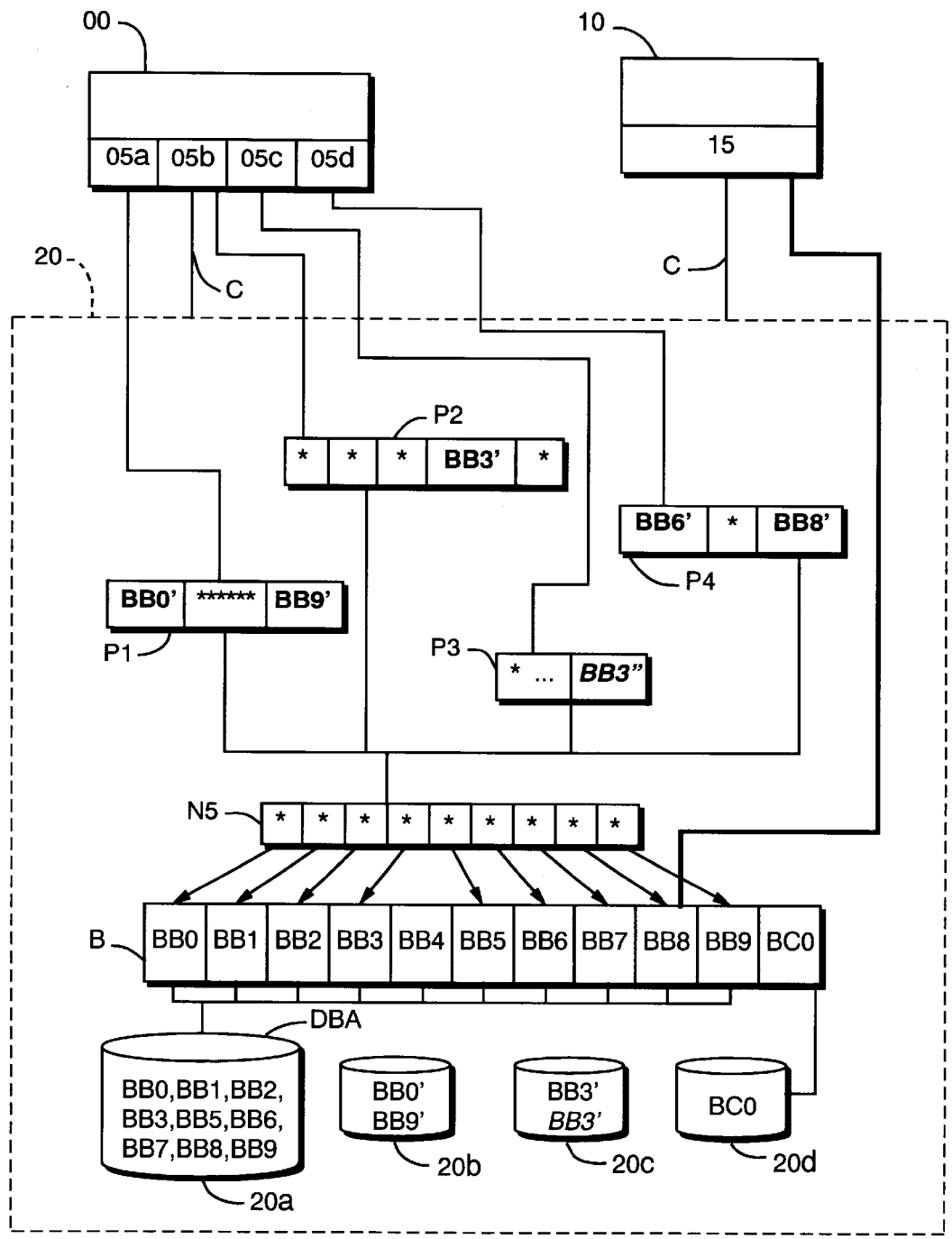
FIG. 1 is a schematic drawing of the present invention.
Figure 8:
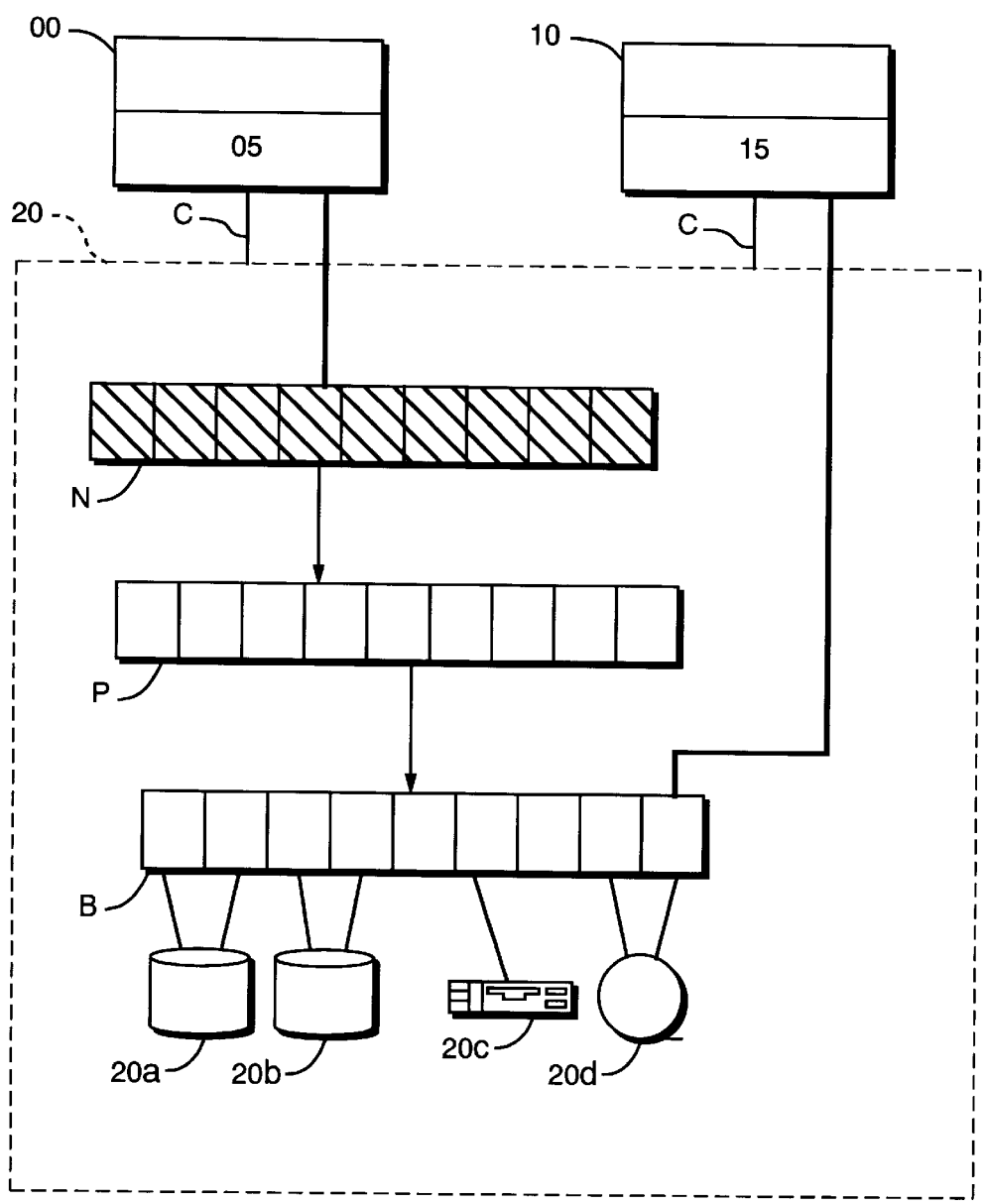
FIG. 8 is a schematic diagram of the present invention used in an HSM system.

In FIG. 1, two host computers 00 and 10 are shown connected by connections C to mass storage system 20. Mass storage system 20 has a plurality of disks 20a–20d, within it. In a preferred embodiment, there is a base map B, which maps the logical blocks BB0–BB9 for database DBA and block BC0 for another database C to corresponding physical locations on disks 20a–20d. In a preferred embodiment, base map B can reflect any of a number of types of magnetic disk formats, such as disks formatted using any of the various types of RAID. Turning briefly to FIG. 8, it can be seen that mass storage system 20 can also include optical disks, such as 20c or magnetic tapes, such as 20d, as part of an hierarchical storage management (HSM) system, or automatic library system. Those skilled in the art will appreciate that mass storage system 20 could include a much larger number of devices such as disks 20a, than those shown here for illustration.

Returning to FIG. 1, negative map N5 of database DBA is shown at the first level above base map B and four positive maps P1–P4 are shown at a level above that. In FIG. 1, applications program 15 in host computer 10 is reading and writing database DBA using base map B of system 20 in a preferred embodiment. To illustrate the use of the present invention, assume application program 15 is a database program, such as the Oracle™ database program. In a preferred embodiment, if application program 15 is the production version and is maintaining the production database DBA, it works with base map B and writes issued by it will update disk 20a, where database DBA is located in this example.

Still in FIG. 1, applications programs 05a–05d in host computer 00 might represent four different database applications designed to work with Oracle™ format databases from different vendors that the user of the present invention wishes to evaluate. As part of the evaluation, the user might want each application program 05a–05d in host computer 00 to work with a full copy of database DBA, but without changing the actual production database DBA that is being used by database program 15 in host computer 10.

To enable such an evaluation, in a preferred embodiment the user might want to create the maps shown in FIG. 1. First, a negative map N5, might be created from database DBA. In a preferred embodiment a negative map creates a frozen view of the file or database that is read-only. It will include flags *(as illustrated with asterisks in the drawings) that refer to the original pointers from base map B for database DBA in itself. In a preferred embodiment, a negative map N5 will let the next lower level map, in this case, base map B, point to new data, if it is updated by application program 15 in host computer 10 or other programs not attempting to update base map B through negative map N5. Next, four positive maps, P1, P2, P3, and P4 would be created from negative map N5. Each application program 05a through 05d would be assigned to or allocated to one of the positive maps P1–P4. Before each application program is tested, however, negative map N5 needs to be made consistent. Since it was initially created from a live database, it probably would not be consistent. Therefore, in a preferred embodiment, it would be temporarily changed to a positive map and made consistent by executing the actual database program 15 while making sure that positive maps P1–P4 are not in use. Once it is consistent, it is changed back to a negative map N5. Now all four evaluations of application programs 05a–05d can proceed with each application program 05, using its own positive map P version of the database.

Still in FIG. 1, since a positive map can be written to as well as read, each positive map P in this example will tend to become different from the others as it is modified by the application program using it. At the same time, since each positive map P was made from negative map N5, which, as a negative map, cannot be written to, neither negative map N5, nor that portion of base map B referring to the production database DBA is changed by these modifications made by application programs 05a through 05d to positive maps P1–P4.

As can be seen in FIG. 1, each positive map P holds pointers to new data and allows the next lower map to hold a pointer to or refer to the old data. For example, if application program 05a updates blocks BB0 and BB9, creating blocks BB0' and BB9' the new blocks will be written to disk (shown here on disk 20b), and map P1 will contain pointers to the new blocks as shown. As illustrated by positive map P1 in this instance, references to BB0 by application program 05a from now on will refer to the updated block, BB0' which is pointed to in positive map P1. If application program 05a refers to block BB1, which has not been updated, the pointer in negative map N5 will be used to refer to the data, as indicated by flag *. Note also that application program 05b may have updated block BB3, creating block BB3' to which positive map P2 now points. If applications program 05c, which is using its own positive map P3, updates what it believes is block BB3, a different entry will be made on disk for it, and positive map P3 will reflect a pointer to it at BB3' as shown. Application program 05c when it refers to BB3 now will use the block BB3 pointed to by positive map P3. If no other changes are made by application program 05c, references made by it to other blocks in database DBA will use the references in negative map N5. Those skilled in the art will appreciate that pointers are disk addresses.

In a preferred embodiment, when a map is created for a file or database, such as negative map N5 in FIG. 1 for database DBA, the present invention does not read database DBA. Instead, it reserves a sufficient area of storage, either in local memory available to it or in electronic storage to hold the new map. A new map is initialized so that each entry contains a flag * that means "inherit the pointer or flag * from the map below." In the example of FIG. 1, negative map N5 would hold flags * that indicate it is to use the pointers or addresses for data that are found in base map B. Positive map P1, before any changes were made to it, would have been all flags *, as well, indicating that it is to inherit the references in negative map N5 for database DBA. In a preferred embodiment, the flags could be anything from a bit setting in a bitmap in each entry to an all zeros setting, depending on the addressing conventions used by mass storage system 20.

Continuing with the example in FIG. 1, assume that the evaluation of all four vendors continues and the user realizes that a special query of the data base would provide a much better test of each vendor's software. However, the data that would make such a query so valuable is missing from the negative map N5 view.

Still in FIG. 1, In a preferred embodiment of the present invention, positive maps P1–P4 can be rolled back in time to their original states. If that occurs, the changes each made would be eliminated. Negative map N5 is again temporarily changed to a positive map, the additional data is inserted and map N5 is changed back again to a negative, frozen view, negative map N5. As a result of the change in negative map N5, in a preferred embodiment of the present invention positive maps P1–P4 are each automatically updated with the change reflecting the new data and the evaluations can continue.

Figure 2:
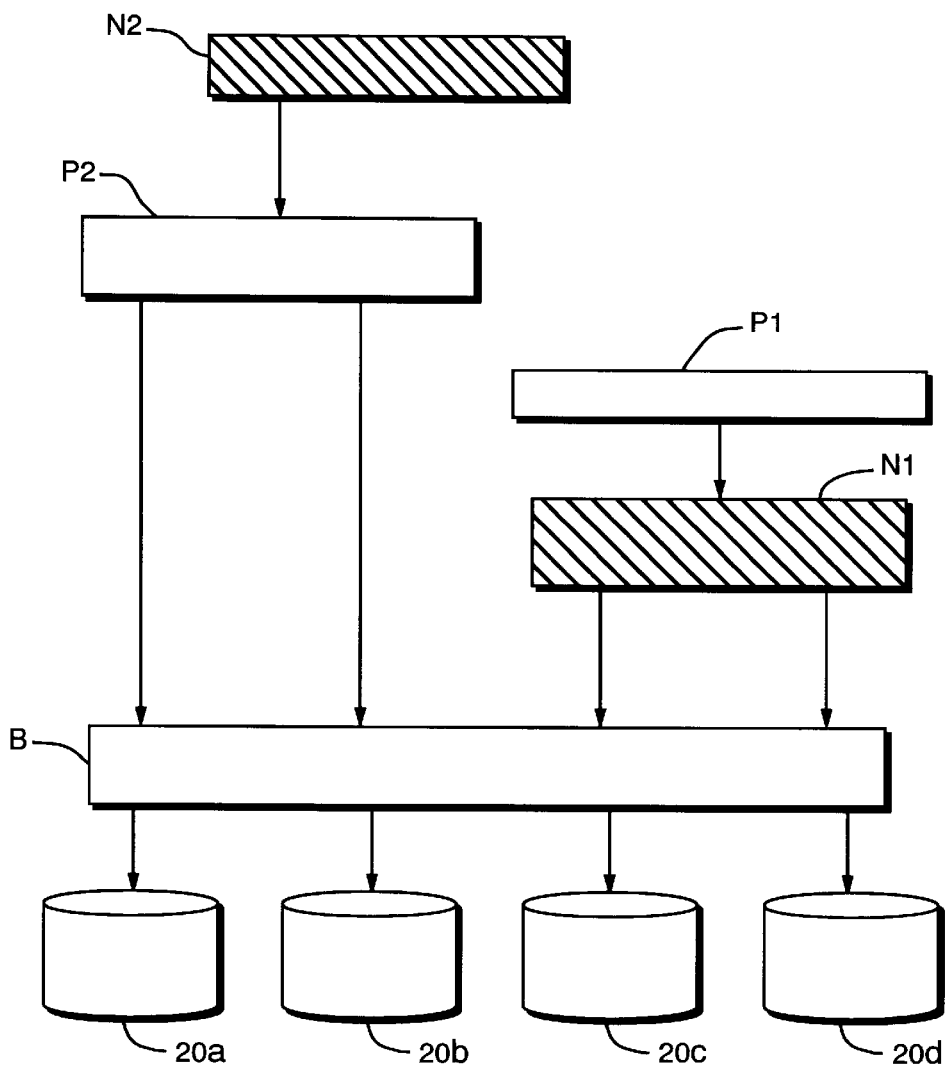
FIG. 2 is a schematic drawing showing several levels of stacked maps according to the method and apparatus of the present invention.

Now turning to FIG. 2, it can be seen that maps can be stacked in multiple levels. Here base map B forms the lowest level, while negative map N1 is the next level up, but negative map N1 covers only data physically stored on disks 20c and 20d. While base map B covers the entire storage system 20, upper level maps such as negative map N1 usually cover only subsets of storage system 20, such as a database on disks 20c and 20d, for example.

Still in FIG. 2, positive map P1 is a next higher level map above negative map N1. Positive map P1 relates to the data physically stored on disks 20c and 20d, but it will reflects base map B as frozen in time by negative map N1. Also in FIG. 2, a different positive map P2, has been created at a higher level than base map B, but in this case, without an intervening negative map N. A higher level negative map N2 has been created to freeze a view of positive map P2, in this example.

Figure 3A:
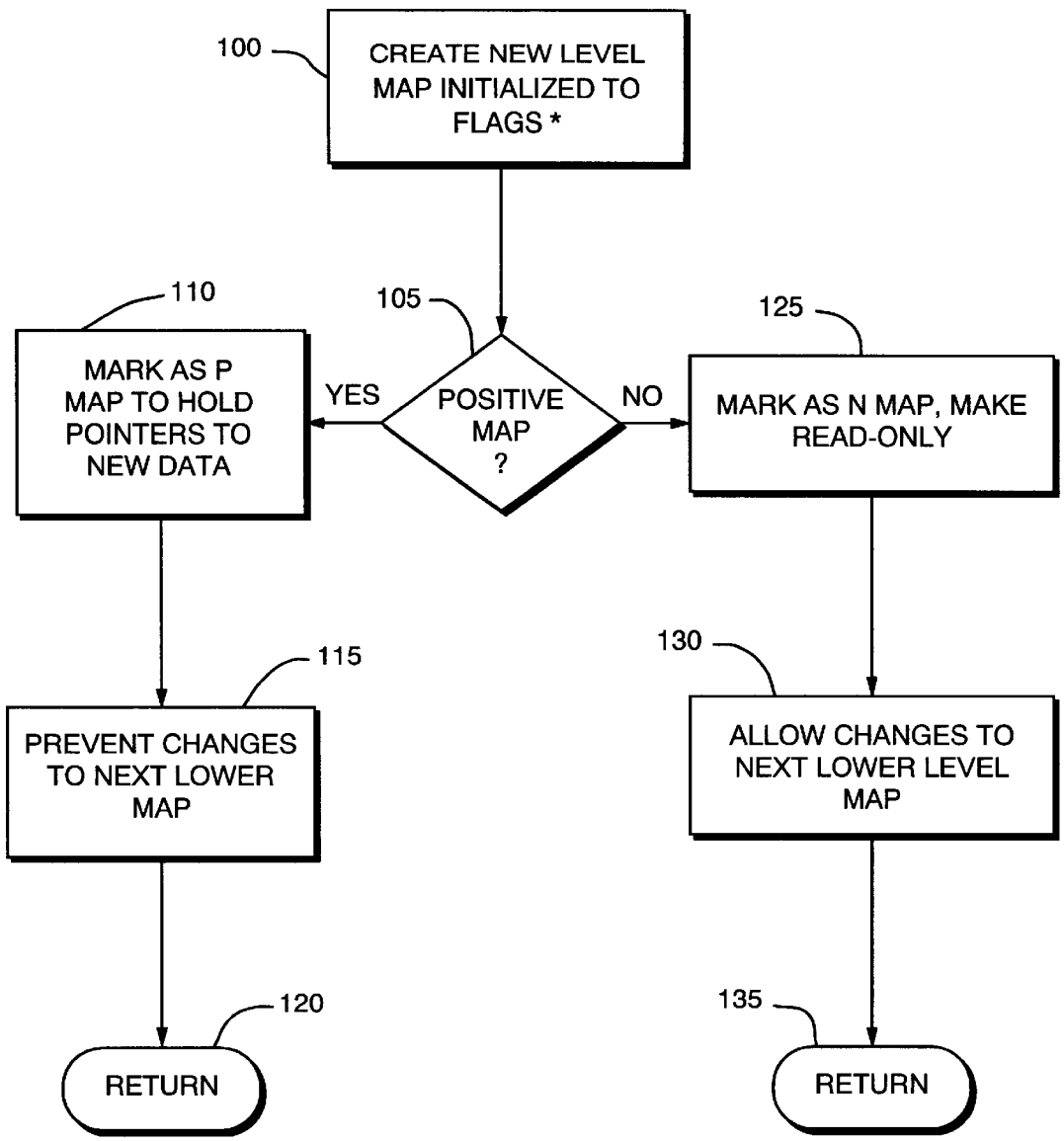
FIG. 3a is a flow diagram of map creation according to the method and apparatus of the present invention.
Figure 9:
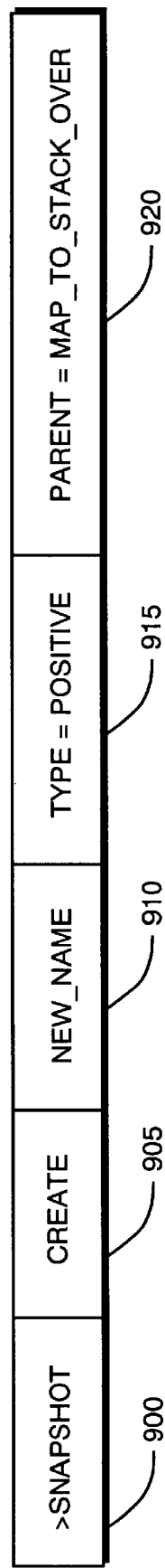
FIG. 9 is a block diagram of a command format of the present invention.

Turning now to FIG. 3a, a flow diagram of the map creation feature of the present invention is shown. At step 100 it has been determined by storage system 20 that a request has been made by the user or system administrator to create a new map. In alternative preferred embodiments, the management of maps can be done either in one of the processors in storage system 20 or in each of the host computers connected to a storage system to be mapped. In a preferred embodiment, this is accomplished by using a simple command formatted as shown in FIG. 9. Turning to FIG. 9 briefly, it can be seen that the name 900, snapshot has been given to this line of code. The command create 905 requests the present invention to create a new map. New__ name 910 is the name to be given to the newly created map. Type 915 indicates whether the present invention is to create a negative or a positive map. In this example, positive has been selected. And parent 920 allows the user to specify the name of the map over which this one will be stacked.

Returning to FIG. 3a, at step 100 a new map is created by the map generator of the system by initializing it with flags that indicate all pointers and references are to be inherited from the next lower level map. Next, at decision block 105, the present invention checks to see if the user desires to create a positive map or a negative map. If positive, the system proceeds to step 110, in which it marks it as a positive map that will store pointers to the new data in itself. In a preferred embodiment, a positive map will be created to insure, as shown at step 115, that no changes are allowed to go through to the next lower level map.

In a preferred embodiment, this is accomplished by a block manager which handles read, write, insert, create, merge, and delete commands. Also in a preferred embodiment the block manager is part of the driver structure of the operating system used by the adapters in mass storage system 20. In an alternative preferred embodiment, the block manager operates as part of the operating system used by the host computers to control access to disks 20, provided that appropriate lock mechanism and similar safeguards are available. In a preferred embodiment, the block manager sees every input/output request to the devices in storage system 20 and uses the present invention to decide whether or how any such input/output request should proceed.

At step 120, of FIG. 3a the system returns to the caller.

Still in FIG. 3a, if the user has specified that a negative map should be created, a preferred embodiment of the present invention marks it as a negative map and read-only at step 125. Then it proceeds, at step 130 to insure that changes are allowed to go through to the next lower level map, provided they are not made through the negative map itself. A negative map is read only and does not allow I/O to pass through it. However, if the map below it is a positive one, that can still be changed. In a preferred embodiment, a negative map is used either to create a backup or to freeze the state of the data at a given point in time.

Figure 3B:
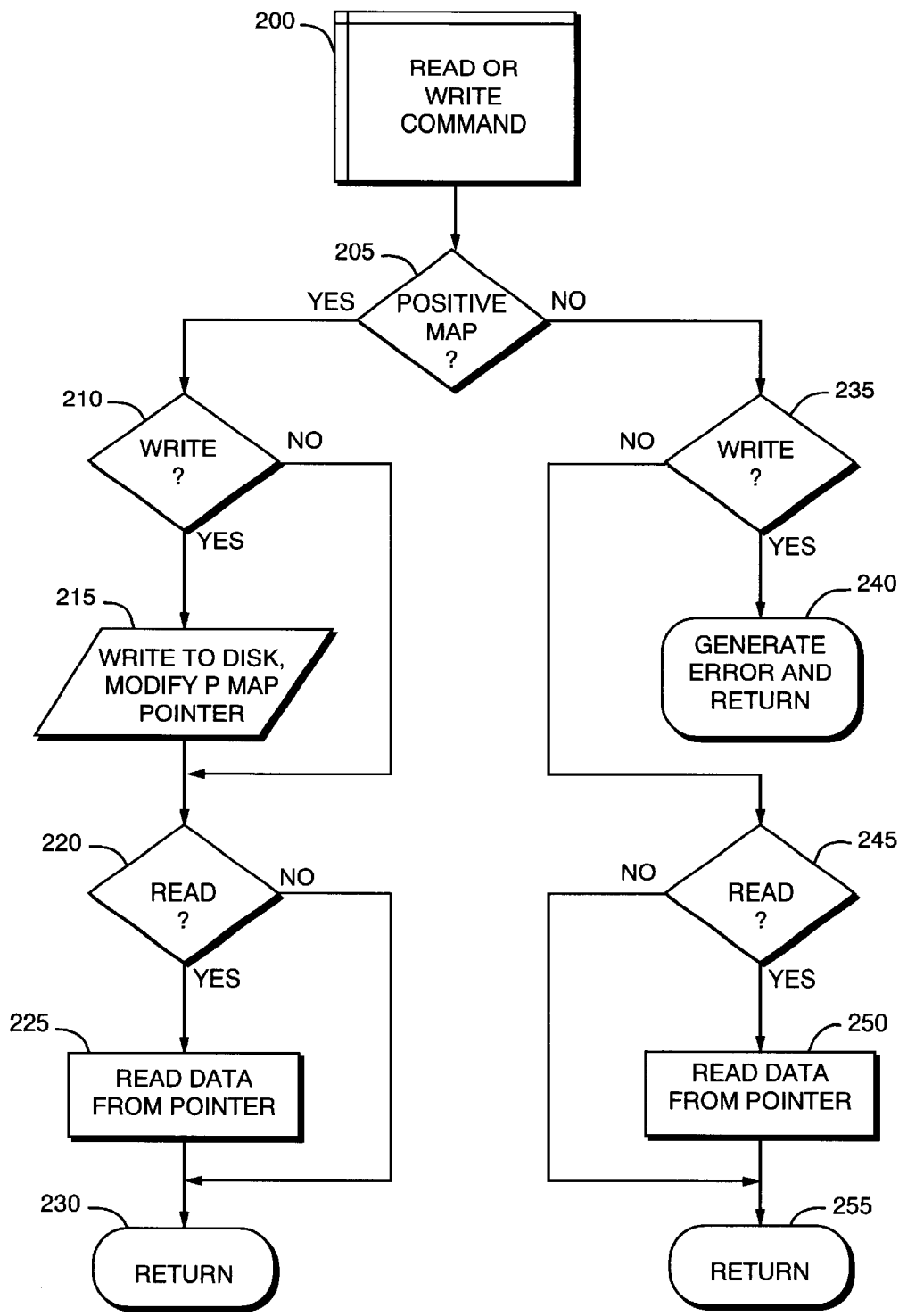
FIG. 3b is a flow diagram of map usage during reads and writes according to the method and apparatus of the present invention.

Now referring to FIG. 3b, as storage system 20 detects a read or write request for a specific map at step 200, a preferred embodiment of the present invention checks, at decision block 205, to see whether the map requested is a positive or negative one. If it is a positive map P, the invention proceeds to step 210, where a check is made to see if the request is a write command, which would alter the data. If it is a write, the invention modifies the positive map at step 215, by allocating a new block from the base map and writing to disk. The pointer to this new location on disk will be stored in the positive map to point to the new data. If the command was not a write, the invention checks at step 220 to see if the command was a read command. If it was a read, a preferred embodiment of the present invention will use the pointer in the positive map for the read operation. If the block being read has not been changed, this will be either the pointer or the reference flag * which has been inherited from the next lower level map. If the read is for a block in the positive map which has been changed, it will be a pointer which is an actual address. If the read is for a block which has not changed, there will be a flag * reference indicating that the address or further reference in the next lower block should be used.

Still in FIG. 3b, if the requested map is a negative one, a preferred embodiment of the present invention checks, at decision block 235, to see if the current command is a write. If it is, a preferred embodiment of the present invention, at step 240 will generate an error message and return, since negative maps are, by definition, read only.

If the current command for this negative map N is a read command, as determined at step 245, the present invention proceeds to step 250, where the data is read using the pointer to it indicated by the negative map and the invention returns at step 255 to the caller.

Figure 4:
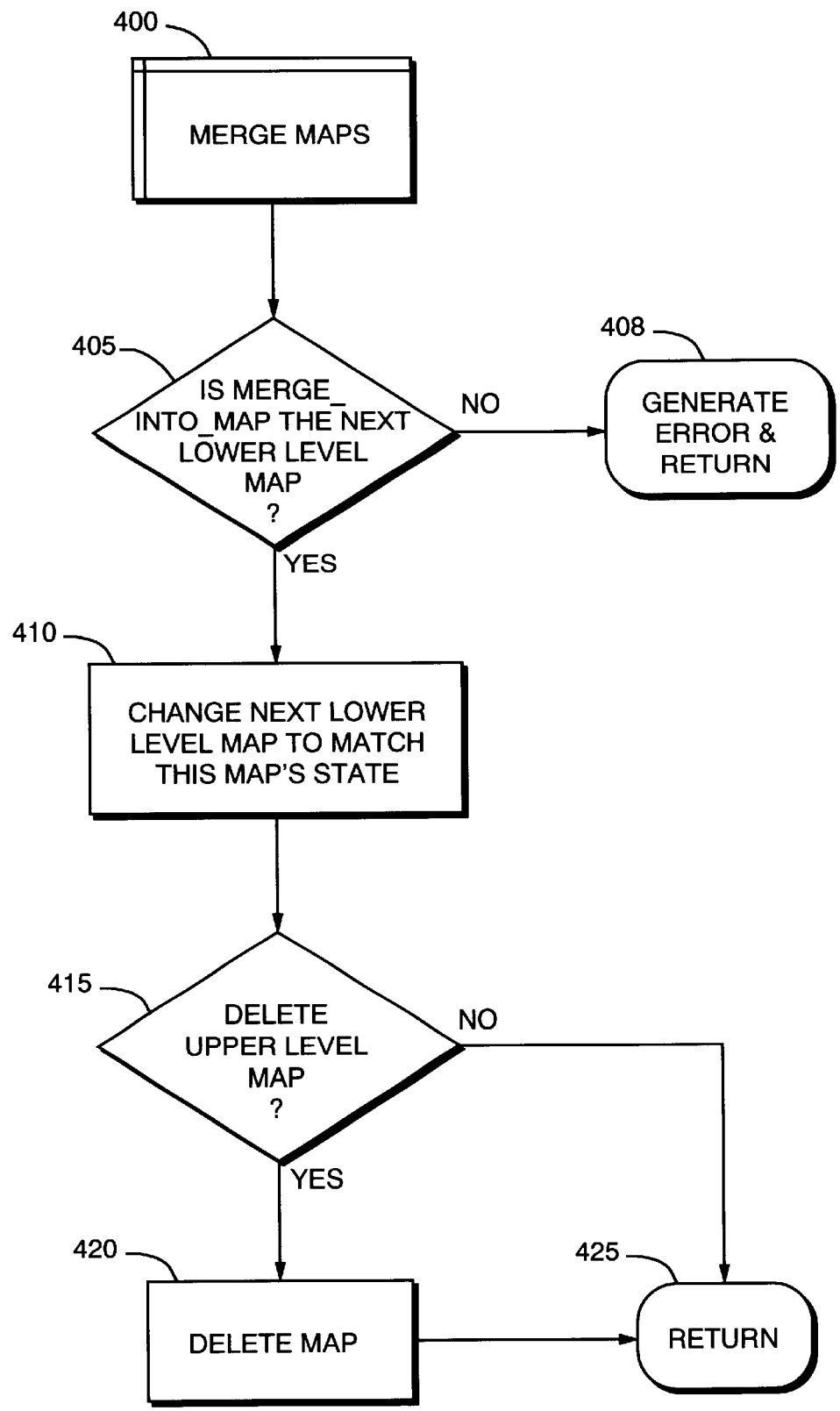
FIG. 4 is a flow diagram of merger according to the method and apparatus of the present invention.

Turning now to FIG. 4, the merge function of the present invention is shown in flow diagram form. At step 400, the present invention has detected a merge request which identifies a first map to be merged into a second map. In a preferred embodiment, a first map is always merged with the next lower level map, as non-contiguous maps cannot be merged. However, if there were three maps stacked one above another, the user could delete the map in the middle and then merge the two remaining maps, since they are now contiguous. If this has been done, however, care must be taken to insure than an inconsistent state of the data has not been created.

Still in FIG. 4, at step 405, the present invention checks to insure that the map to be merged into is in fact, the next lower level map. If it is not, an error is returned at step 408. If the map to be merged into is contiguous, that is, it is the next lower level map, then at step 410, the invention changes the next lower level map to match the upper level or first map's state. Once this has been accomplished, a preferred embodiment of the present invention checks, at block 415, to see if the user wishes to have the upper level map deleted and does so at step 420, if the answer is yes. If not, the system leaves the upper level map and the newly merged lower level map in place and exits at step 425. As will be apparent to those skilled in the art, the system could automatically delete an upper level map after a merger in an alternate preferred embodiment.

Figure 5:
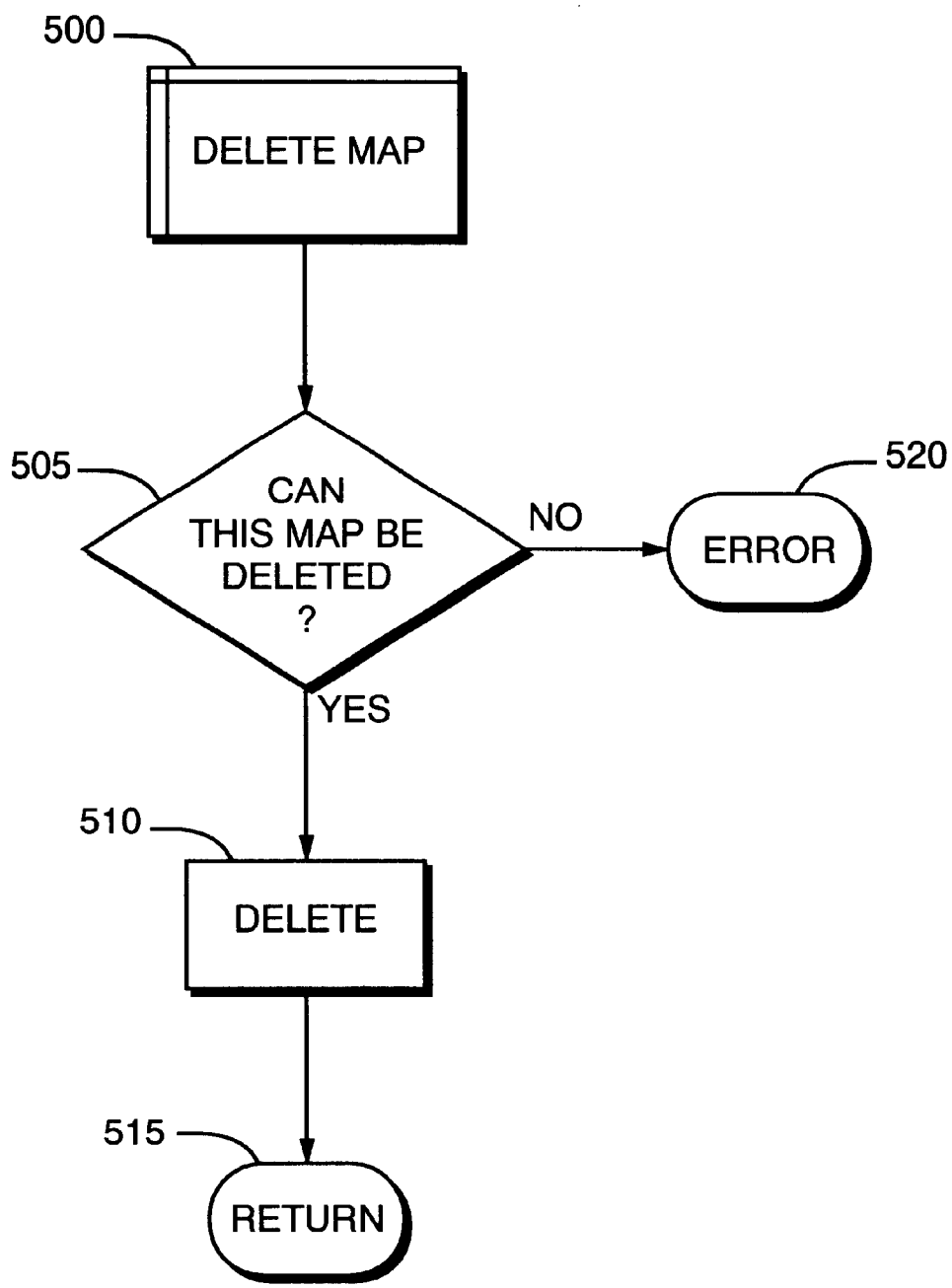
FIG. 5 is a flow diagram of deletion according to the method and apparatus of the present invention.

Now in FIG. 5, the deletion process of the present invention is shown. Once a deletion request has been detected at step 500, a preferred embodiment of the present invention checks to see, at step 505, whether this map can be deleted. There are several reasons why a particular map might not be deletable. First, if it is the base map, deletion of it may not be appropriate for the particular type of storage system 20 in use. Second, to insure data consistency, in one preferred embodiment the invention would only allow deletion at the top level of a stack of maps and then work downwards. This would avoid the data inconsistency problems mentioned above. In an alternative preferred embodiment, however, deletion of a level other than the uppermost in a stack would be allowed, provided the user understands the possible data inconsistency problems this might create.

Note that in both merge and delete operations, only map manipulation is done, no changes or moves are made to any data stored in disk system 20. Those skilled in the art will appreciate that this significantly reduces time and space usage.

Figure 6A:
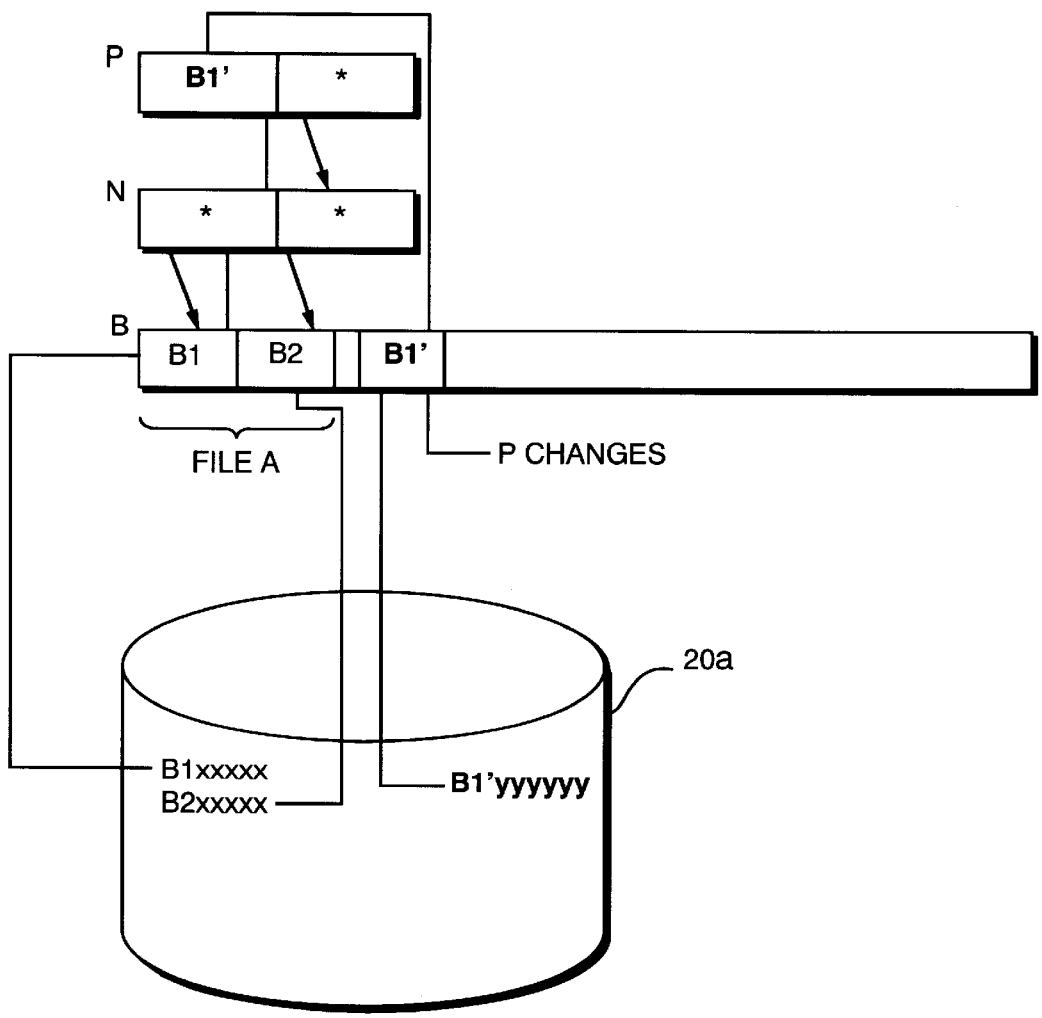
FIGS. 6a, 6b and 6c are schematic diagram showing examples of a positive map and next lower level maps according to the method and apparatus of the present invention.

FIG. 6a illustrates in more detail how changes are handled when the change request is made to a positive map P and the next lower level map is a negative map N. As shown in FIG. 6a, File A in base map B has only two pointers to blocks, B1 and B2 on disk 20a. When negative map N is created, it creates a "frozen" snapshot of the state of File A by including in itself flags * that indicate negative map N is to inherit the pointers to B1 and B2 as they are stored in base map B for File A at that time. When positive map P is created from negative map N, it will initially have flags * in it that say, in effect, inherit the pointers or references from negative map N, which, in this case would be flags that say inherit the pointers in base map B. However, when an application program under evaluation updates block B1 in File A, through positive map P, the present invention will write the new block, B1' out to disk and update the pointer in positive map P to point to B1' now, instead of the flag * which means inherit pointers. As can be seen in this example, negative map P is a snapshot of File A at a given point in time. Positive map P shows how File A might have been updated by the application program under test, but does not allow any changes to occur to negative map N. The changes P changes to Base map B resulting from the application program are kept separate from File A and are identified with positive map P's view of the data.

Figure 6B:
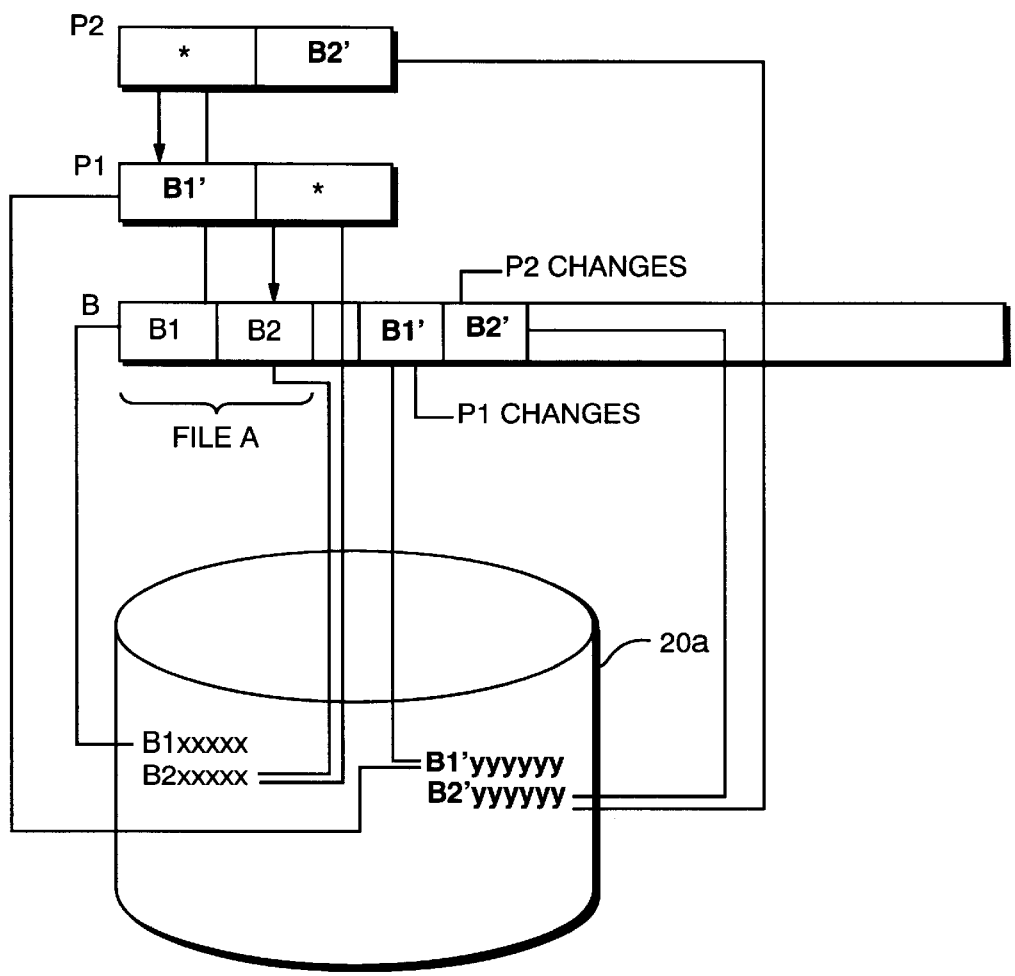

FIG. 6b illustrates what happens when change requests are made to a positive map P2, when the next lower level map is also a positive map P1. In this example, base map B begins with only two pointers for File A, to blocks B1 and B2. When Positive map P1 is created, those pointers are effectively stored in it, as well, by means of the flags * which indicate they are to be inherited from base map B. In this example, if the user writes an update to block B1, through positive map P1, the present invention prevents any changes to the next lower level map, in this case, base map B's view of File A, but does create a new block B1' and a pointer to it in positive map P1. Note that base map B will contain pointers to all data written on the disk system. In a preferred embodiment, the new blocks will be written on the disk and pointers for them created in base map B and positive map P1.

Still in FIG. 6b, assume that positive map P2 is created from positive map P1 to test another program. When initially created, positive map P2 will effectively be the same as positive map P1, namely pointing to blocks B1' and to a flag * that ultimately refers to B2. In this example, assume that the program for which positive map P2 was created wishes to update block B2 with new data. Since positive map P2 is a positive map, it will allow changes to be made to itself, but not to the next lower level map. Thus, new block B2' will be written to disk 20a and a pointer to it will be entered in base map B, as well as in positive map P2. Note again that the changes to base map B do not affect the original view of File A.

Figure 6C:
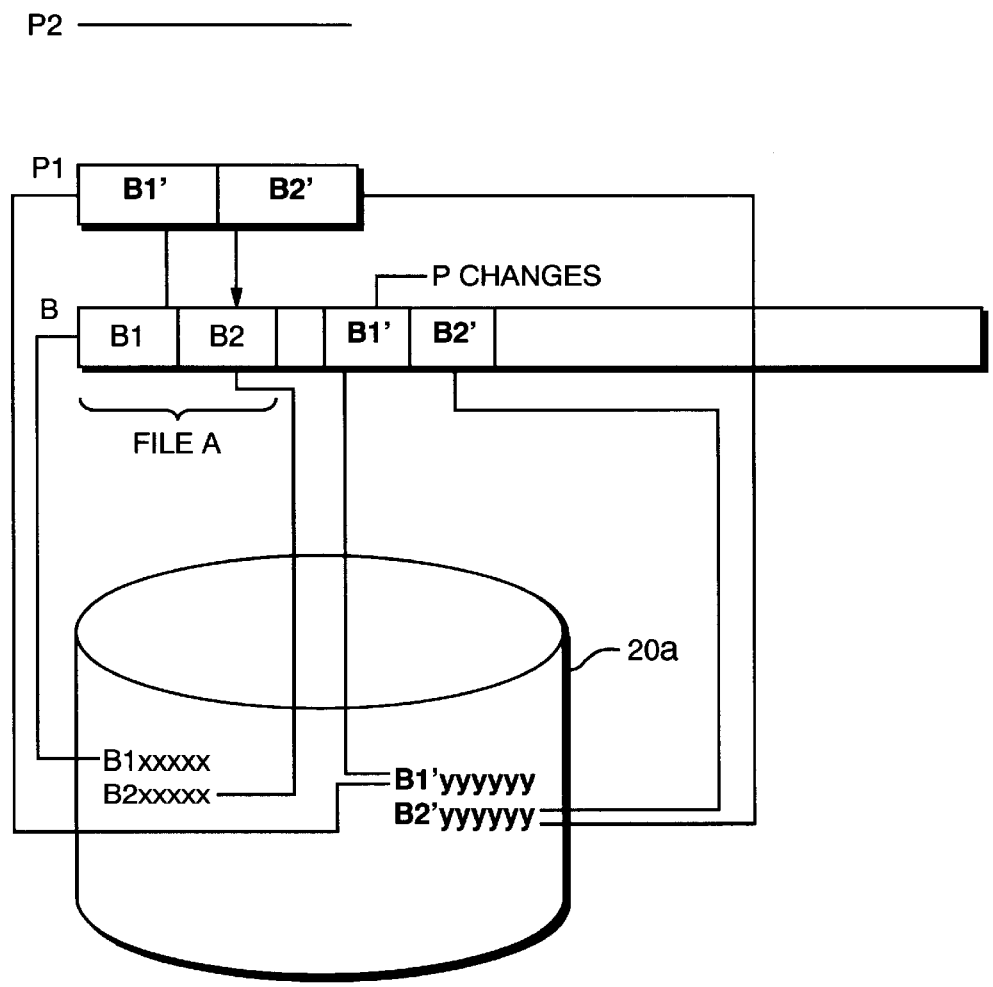

FIG. 6c illustrates a merge operation in which the updated positive map P2 from the example of FIG. 6b is merged into positive map P1. Here it can be seen that after the merge, positive map P1 has the same pointer to updated block B1' it had in FIG. 6b, but now, in FIG. 6c, after the merge, the pointer for block B2 has been changed to point to block B2' which had been updated in positive map P2. In a preferred embodiment, as shown in FIG. 6c, after a merge operation, the upper map, positive map P2, in this case, is deleted automatically.

As mentioned, the present invention's stacked maps such as that shown in FIG. 1 can be used for application evaluation and testing. As shown in FIG. 1, a negative map N5 is created first for File A, and then a positive map P1 is stacked above it. Negative map N5 freezes the view of database DBA to the time of creation, but allows all other users to continue to change the actual storage base map B. The positive map P1 of FIG. 1 above this will trap all changes and hold them without allowing them to go to the lowest storage map, base map B. Once both maps have been created, the user can run the application program being tested and modify the files or database using positive map P1. When testing is done, both negative map N5 and positive map P can be deleted.

FIG. 6b illustrates how a storage commit feature is implemented in a preferred embodiment. In FIG. 6b a positive map P1 is created by an applications program and stacked above the base map B. If the applications program being tested performs updates using this approach allows the applications program to perform the update on positive map P1, while base map B for File A continues to be unchanged. After the applications program completes, the user can decide either to commit the changes by merging the positive map P1 into the base map B as described above, or to rollback the changes by deleting positive map P1 as described above. If positive map P1 maps the entire storage system 20, instead of only File A, it allows the entire storage system 20 to be treated as a single large database or file, in essence.

Figure 7:
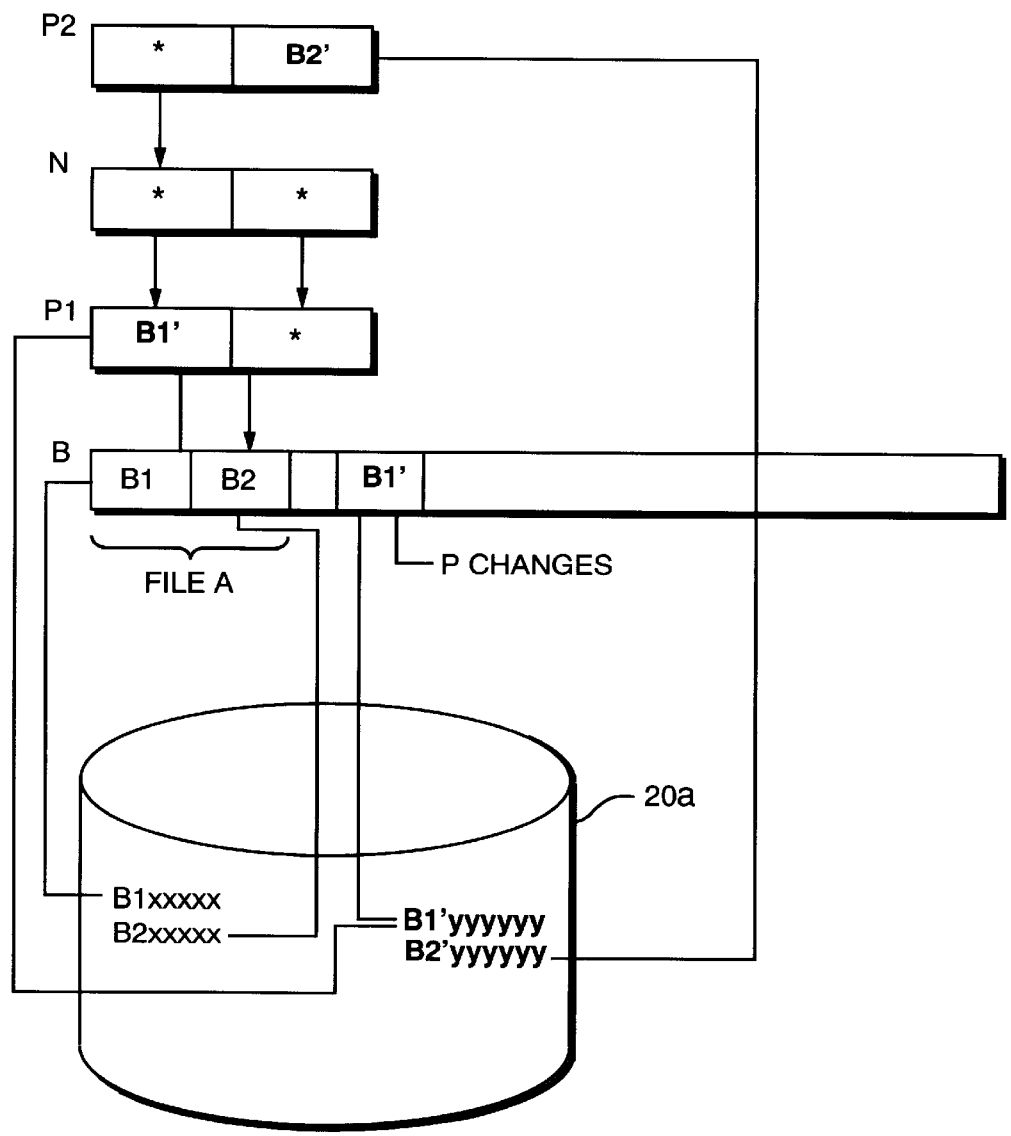
FIG. 7 is a schematic diagrams showing an example of a delayed autocommit feature of the present invention.

A variation of the storage commit function shown in FIG. 6b is implemented as an autodelayed commit feature shown in FIG. 7. In a preferred embodiment, a positive map P1 would be created for File A. Negative map N, would then be created above it, to freeze that state. Following that, positive map P2 would be created from negative map N, and file systems would use positive map P2 to hold all changes for a given time period, such as 30 minutes, and then automatically commit the changes by merging at the end of the time period, rather than at the end of the execution of the applications programs. In this embodiment, negative map N prevents any changes from being made to positive map P1. At the end of the time period, negative map N can be deleted and positive map P2 merged with positive map P1 to effect the auto commit.

In connection with the autodelay feature shown in FIG. 7, the majority of restores from backups are for user errors in either deleting a file or saving the wrong changes. Typically a user will know immediately that this has occurred. When it does, the administrator can turn off the auto commit feature in a preferred embodiment, then access the file's state before the user made the error, (here saved in both positive map P1 and negative map N), restore one of those maps and then turn autocommit back on.

In a preferred embodiment, the present invention creates maps that indicate whether or not a block of data that has been allocated to a physical disk has actually been written. This is shown in FIG. 1, by BB4. Since BB4 has not actually been written there is no line connecting it to any of disks 20a–20d. This feature permits the present invention to improve the speed of read operations in such cases. Since the system knows that the block has not been written, it simply returns a block of zeros without actually accessing the disk drive. Several database programs will allocate large areas of storage space that remain unused until writes actually occur. The present invention can improve the speed of read commands directed to the unused areas, if they occur.

Figure 10A:
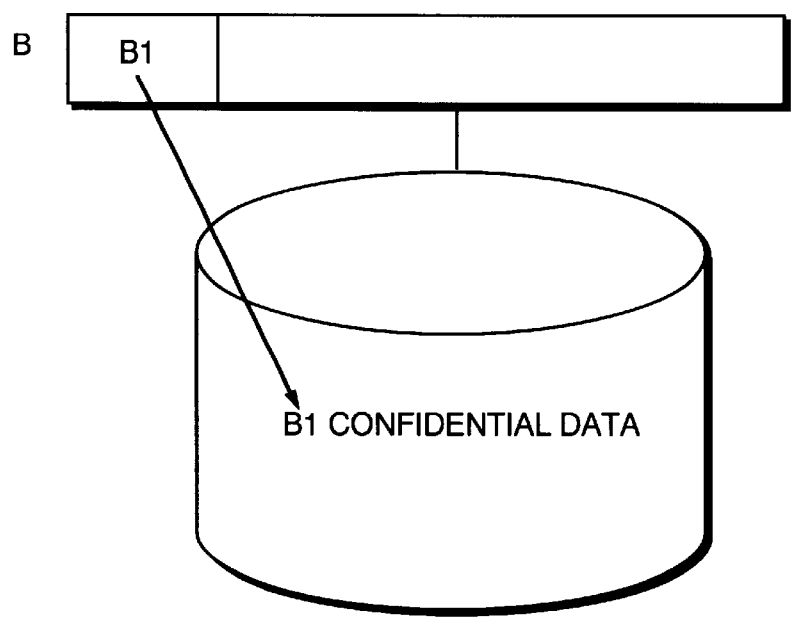
FIG. 10a & 10b are block diagrams of a secure data feature of the present invention.

In a preferred embodiment, this fast read feature can also be used to support a delete block command so that government requirements for secure data can be met. Those skilled in the art know that in most disk systems, when a block of data is deleted, pointers to it are usually removed, but the data is not automatically erased. This is depicted in FIG. 10a, where base map B reflects the deletion of pointers to block B1. However, as the grey arrow pointing to block B1 shows, it is relatively easy to find block B1 if base map B or the directory pointing to the block is not erased, too. Many file saver programs take advantage of this fact when they "retrieve" deleted files.

Figure 10B:
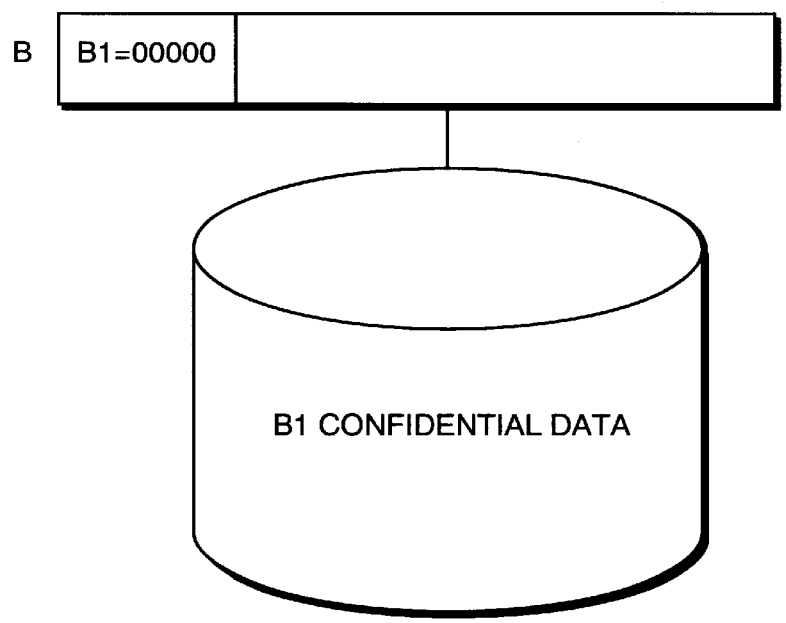

When a block of data is deleted using the present invention, it is marked as not existing in the map, as indicated, in FIG. 10b by the zeros stored in base map B for block B1. The present invention uses this fast read feature to return all zeros, thus preventing sensitive data from being accessed once it has been deleted. Storage system 20 can schedule overwrites or erases of the actual deleted block at a lower priority. As the input/output load on the system lowers, the overwrites of the blocks can be done. While waiting for overwrite, if the block gets properly reused and rewritten for another purpose, it will be removed from the list scheduled for overwrites.

Returning again to FIG. 1, this also illustrates how a preferred embodiment of the present invention can be used for sharing data very efficiently and economically between two different applications programs on two different host computers. If host computer 10 has a 100 gigabyte database DBA on disk 20a available to it, a negative map N5 can be created according to the method and apparatus of the present invention, with one or more positive maps P as shown in FIG. 1 above it made available to the host computer 00. No data has actually been moved. The negative and positive maps simply contain pointers to data or flags * indicating pointers are to be inherited. But host computer 00 can "modify" the data using positive maps P, while host computer 10 still sees the original copy of base map B. A merge of the maps would update the storage for both sides. Instead of taking up 200 gigabytes of disk space to allow both host computers to see the same data, the present invention allows this to happen using only the original 100 gigabytes plus a few bytes for the maps.

Still in FIG. 1, it can be seen that host computers 00 and 10 could also both share negative map N5, as a read-only view of database DBA, if desired, or with appropriate safeguards in the respective programs, they could also share the base map B view of database DBA. Again, two computers, in this case, could share a 100 gigabyte database without using 200 gigabytes of disk space. Those skilled in the art will appreciate that multiple host computers would thus be enabled to share one physical view of the database using the present invention, saving not only hundreds of gigabytes in copies of the database, but also hours of time spent making copies.

In a preferred embodiment, maps created by the present invention are stored in memory accessible to the block manager described above. Those skilled in the art will appreciate that such memory can be local RAM memory in a processor, globally shared RAM memory, disk storage, or other forms of electronic storage.

In a preferred embodiment, the present invention is implemented in the C programming language for execution in a director or control logic of a storage system or a host computer. Those skilled in the art, however, are aware it could be implemented in assembler language, in C++, Pascal, ADA, or other programming languages. Additionally, it will be apparent that the logic of the present invention could also be embodied in firmware, microcode, or hardware circuitry instead of software. While one preferred embodiment implements all of the features of the present invention as part of the storage system, it will be apparent to those skilled in the art that some or all of the features might also be implemented as part of either file systems, operating system, or even applications programs software.

Those skilled in the art will appreciate that the embodiments described above are illustrative only, and that other systems in the spirit of the teachings herein fall within the scope of the invention.

What is claimed is:

1. A computer implemented data storage system for storing and retrieving data in stacked maps, comprising:

a device driver for receiving all input and output commands made to storage devices in communication with a host computer;

a block manager operating with the device driver and responsive to read, write, insert, create, merge, and delete commands sent to each storage device, the block manager being capable of storing, in a lower level map, the addresses of designated physical blocks on at least one storage device, and being capable of representing, in at least one upper level map, a group of addresses related to a lower level map wherein the upper level map is a positive map referring to the addresses referred to in the next level map and containing the addresses of physical blocks the block manager changes from those physical blocks represented in the next lower level map.

2. The system of claim 1, wherein the lower level map is a base map holding addresses pointing to all storage devices in communication with a host computer.

3. The system of claim 2 wherein the block manager responds to a read command for a base map by providing the data at the address specified by the base map.

4. The system of claim 1, wherein the upper level map is a negative map referring to all the addresses represented by a lower level map immediately next to the negative map.

5. The system of claim 4, wherein the negative map is a read-only map to which the block manager will not permit any changes.

6. The system of claim 5, wherein the block manager insures that the physical blocks represented by the next lower level map to a positive map are not changed.

7. The system of claim 5, wherein the block manager responds to a read command for a positive map by providing the data at the address specified in the positive map, if the data has been changed for this positive map, and by providing the data at the address indicated in the next lower level to the positive map if no change has occurred to the data for this positive map.

8. The system of claim 5, wherein the block manager responds to a write command for a positive map by writing the specified data to the storage device, making an entry in the base map therefor, and making an entry in the positive map therefor.

9. The system of claim 5, wherein the block manager creates a positive map of changes being made to a file, and upon receipt of a commit instruction from the user, merges the positive map with the next lower level map by combining the positive map with a next lower level map so that the content of the next lower level map is identical to the content of the positive map.

10. The system of claim 9, wherein the block manager provides an autodelay file commit by creating a first positive map of a file, creating a negative map to freeze the state of the first positive map, then creating a second positive map stacked over the negative map to hold all changes for a specified time period, whereby at the end of the specified time period the negative map is deleted and the second positive map is merged with the first positive map by combining the second positive map with the first positive map so that the content of the first positive map is identical to the content of the second positive map, thereby committing the changes.

11. The system of claim 4 wherein the block manager responds to a read command for a negative map by providing the data at the address indicated by the negative map.

12. The system of claim 4, wherein the block manager responds to a write command for a negative map by returning an error indicator.

13. The system of claim 4, wherein the block manager creates a backup of a file stored on a storage device by creating a negative map of the file without moving any of the data stored at the addresses indicated in the negative map.

14. The system of claim 1, wherein a plurality of upper level maps are created by the block manager.

15. The system of claim 1, wherein the block manager responds to a merge command by combining an upper level map with a next lower level map so that the content of the next lower level map is identical to the content of the upper level map.

16. The system of claim 1, wherein the block manager deletes a map in response to a delete command.

17. The system of claim 1, wherein the block manager inserts a map as specified by the user.

18. The system of claim 1, wherein the block manager responds to a write command for a base map by writing the specified data to the storage device and updating the address in the base map therefor.

19. The system of claim 1, wherein the block manager marks a block that has been deleted as non-existent in the maps containing the address of that block.

20. The system of claim 19, wherein the block manager responds to a read command for a non-existent block by returning zeros instead of reading data at the address requested, thereby providing a fast read feature.

21. The system of claim 20, wherein the block manager responds to read commands for blocks of secure data that has been deleted by marking the maps related thereto to show that said blocks are non-existent so that zeros will be returned, instead of data, if read commands are received for said blocks.

22. The system of claim 1, wherein the block manager creates a copy of a file stored on a storage device by creating an upper level map referring to the addresses of the physical blocks in the file without moving any of the data stored at those addresses.

23. A computer implemented data storage method for storing and retrieving data in stacked maps, comprising the steps of:

receiving all input and output commands made to storage devices in communication with a host computer by means of a device driver;

storing, in a lower level map, the addresses of designated physical blocks on at least one storage device, and representing, in at least one upper level map, a group of addresses related to a lower level map through a block manager working with the device driver and responding to read, write, insert, create, merge, and delete commands sent to each storage device wherein the step of representing, in at least one upper level map, a group of addresses related to a lower level map further comprises the step of creating a positive map containing the addresses of physical blocks the block manager changes from those physical blocks represented in the next lower level map as well as referring to the addresses referred to in the next lower level map.

24. The method of claim 23, wherein the step of storing the addresses of designated physical blocks in a lower level map further comprises the step of storing the addresses of designated physical blocks in a base map holding addresses pointing to all storage devices in communication with a host computer.

25. The method of claim 24, wherein the step of responding to a read command for a base map further comprises the step of providing the data at the address specified by the base map.

26. The method of claim 24, wherein the step of responding to a write command for a base map further comprises the step of writing the specified data to the storage device and updating the address in the base map therefor.

27. The method of claim 23, wherein the step of representing in an upper level map a group of addresses related to a lower level map is the step of referring in a negative map to all the addresses represented by a lower level map immediately next to the negative map.

28. The method of claim 27, wherein the step of referring in a negative map further comprises the step of making the negative map a read-only map to which the block manager will not permit any changes.

29. The method of claim 28, wherein the step of creating a positive map further comprises the step of insuring through the block manager that the physical blocks represented by the next lower level map to a positive map are not changed.

30. The method of claim 27 wherein the step of responding to a read command for a negative map further comprises the step of providing the data at the address indicated by the negative map.

31. The method of claim 30, wherein the step of responding to a write command for a positive map further comprises the step of writing the specified data to the storage device, making an entry in the base map therefor, and making an entry in the positive map therefor.

32. The method of claim 27, wherein the step of responding to a write command for a negative map further comprises the step of returning an error indicator.

33. The method of claim 27, further comprising the step of creating a backup of a file stored on a storage device by creating a negative map of the file without moving any of the data stored at the addresses to which the negative map refers.

34. The method of claim 33, further comprising the step of creating a positive map of changes being made to a file, and upon receipt of a commit instruction from the user, merging the positive map with the next lower level map by combining the positive map with a next lower level map so that the content of the next lower level map is identical to the content of the positive map.

35. The method of claim 33, further comprising the step of providing an autodelay file commit by creating a first positive map of a file, creating a negative map to freeze the state of the first positive map, then creating a second positive map stacked over the negative map to hold all changes for a specified time period, whereby at the end of the specified time period the negative map is deleted and the second positive map is merged with the first positive map by combining the second positive map with the first positive map so that the content of the first positive map is identical to the content of the second positive map, thereby committing the changes.

36. The method of claim 23, wherein the step of representing, in at least one upper level map, a group of addresses related to a lower level map further comprises the step of creating a plurality of upper level maps through the block manager.

37. The method of claim 23, wherein the step of responding to a merge command further comprises the step of combining an upper level map with a next lower level map so that the content of the next lower level map is identical to the content of the upper level map.

38. The method of claim 23, wherein the step of responding to a delete command further comprises the step of deleting a specified map.

39. The method of claim 23, wherein the step of responding to an insert command further comprises the step of inserting a map between two contiguous maps as specified by a user.

40. The method of claim 23, wherein the step of responding to a read command for a positive map further comprises the step of providing the data at the address specified in the positive map, if the data has been changed for this positive map, and by providing the data at the address referred to in the next lower level to the positive map if no change has occurred to the data for this positive map.

41. The method of claim 23, further comprising the step of marking a block that has been deleted as non-existent in the maps containing the address of that block.

42. The method of claim 41, wherein the step of responding to a read command for a non-existent block further comprises the step of returning zeros instead of reading data at the address requested, thereby providing a fast read feature.

43. The method of claim 41, wherein the step of responding to read commands for blocks of secure data further comprises the step of marking the maps related thereto to show that said blocks are non-existent so that zeros will be returned, instead of data, to read commands received for said blocks.

44. The method of claim 23, further comprising the step of creating a copy of a file stored on a storage device by creating an upper level map referring to the addresses of the physical blocks in the file without moving any of the data stored at those addresses.

* * * * *